United States Patent [19]

Yoshimura

[11] 4,187,798
[45] Feb. 12, 1980

[54] METHOD OF DETECTING DEFECTIVE PORTION OF SEALING

[75] Inventor: Tetsuya Yoshimura, Yokohama, Japan

[73] Assignee: Nagatanien Honpo Co., Ltd., Tokyo, Japan

[21] Appl. No.: 896,888

[22] Filed: Apr. 17, 1978

[30] Foreign Application Priority Data

Jun. 29, 1977 [JP] Japan .................................. 52-76576

[51] Int. Cl.² ...................... B65B 31/02; G01N 31/22
[52] U.S. Cl. ................................... 116/206; 23/230 L; 73/49.3
[58] Field of Search ............ 116/114 AM, 114 P, 206; 73/40.7, 49.2, 49.3, 49.8; 53/53; 23/230 L

[56] References Cited

U.S. PATENT DOCUMENTS

| | | | |
|---|---|---|---|
| 1,478,445 | 12/1923 | McClure | 116/114 P X |
| 1,915,965 | 6/1933 | Williams | 116/114 P |
| 2,318,307 | 5/1943 | Harris | 116/206 |
| 3,091,114 | 5/1963 | Webster | 73/49.3 |
| 3,093,242 | 6/1963 | Huyck et al. | 116/206 X |
| 3,102,082 | 8/1963 | Brewer | 195/139 |
| 3,555,884 | 1/1971 | Yamamoto et al. | 73/49.3 |
| 3,744,210 | 7/1973 | O'Lenick | 73/49.3 |
| 3,899,295 | 8/1975 | Halpern | 23/230 L |
| 4,125,822 | 11/1978 | Perren et al. | 23/230 L |

FOREIGN PATENT DOCUMENTS 1925248  11/1970  Fed. Rep. of Germany ........ 23/230 L Primary Examiner—Daniel M. Yasich
Attorney, Agent, or Firm—Remy J. VanOphem

[57] ABSTRACT

A method of detecting the defective portion of sealing comprising injecting into a moisture-tight container or package having a sealed portion a detection liquor consisting essentially of a colored liquid organic compound small in surface tension and high in permeability into small clearances. The defective portion of sealing is readily detected by exudation of the detection liquor outside the moisture-tight container.

5 Claims, 4 Drawing Figures

METHOD OF DETECTING DEFECTIVE PORTION OF SEALING

BACKGROUND OF THE INVENTION

1. Field of the Invention

This invention relates to a method of detecting the defective portion of sealing of a moisture-tight container or package intended to preserve the contents free from moisture.

2. Description of the Prior Art

There are many kinds of moisture-tight containers or packages housing the contents in a moisture-free condition including, for example, a bag of a synthetic resin film or aluminum foil, a bag of a sheet prepared by laminating a synthetic resin film and/or a metal foil on a paper base, and a rigid container of synthetic resin such as tapper. These moisture-tight containers or packages are selectively used depending on the properties of the contents.

In general, a majority of these containers or packages housing the contents are prepared on a mass production basis by using, for example, a rapid wrapping machine and various kinds of such containers or packages are available on the market. The sealing of such containers is seemingly perfect, but moisture absorption troubles occurring within the containers or packages are not negligible. Particularly, the container or package produced by utilizing a rapid wrapping machine tends to give rise to the moisture absorption trouble.

The moisture absorption trouble is caused in many cases by defective sealing or damage done to the sealed portion in the wrapping stage, though the presence of pin holes in the wrapping material (moisture-tight sheet) or the moisture permeability of the wrapping material is sometimes responsible for the moisture absorption trouble. The defective sealing is caused by, for example, the entry of the contents in the sealed portion, the occurrence of foldings near the sealed portion or, in the case of heat seal, the split by over-heating along the inner edge of the sealed portion. In any case, the defective portion of sealing is so small that it is difficult to detect it and, thus, the defective portion tends to be overlooked. Consequently, the packed material absorbs moisture present in the air during preservation and, thus, is deteriorated. Further, where the packed material comprises a substance capable of absorbing a large amount of moisture, even an appreciable amount of moisture absorbed fails to enable the entire packed material to present a noticeable appearance. In such a case, it is difficult to recognize the defective portion of sealing.

Conventional methods for detecting the defective sealing include, for example, an optical method and a physical or chemical method. The former utilizes the irradiation of X-rays or ultraviolet rays or transmission of light so as to detect the defective portion of sealing. On the other hand, the latter utilizes a gas injection into a moisture-tight container or immersion of such a container into liquor. In this case, leakage of gas outside the container or dissolution of the packed material into the liquor is detected and measured physically or chemically.

However, the optical method necessitates a costly apparatus and involves troublesome operations of the apparatus. In addition, the result of the examination does not always reflect accurately the actual state of moisture absorption of the packed material. Suppose the optical method is applied to a bag of a laminated sheet consisting of an aluminum foil and a thermoplastic film for detecting the defective portion of sealing. In this case, even a slight damage to the aluminum foil may be detected, but the detection does not necessarily indicate moisture absorption of the packed material because moisture does not permeate through the laminate if no damage is done to that portion of the thermoplastic film which corresponds to the damaged portion of the aluminum foil. On the other hand, the physical or chemical method is not satisfactory in that it fails to locate specifically the defective portion of sealing.

An additional prior art to be noted uses an environmental test apparatus set under predetermined conditions. In this case, the defective sealing is detected by measuring the change in weight of the test piece or the desiccant housed in the moisture-tight container. Indeed, the test result of this method accurately reflects the actual state of moisture absorption of the packed material, but this method requires a considerably long testing time and fails to locate specifically the defective portion of sealing.

SUMMARY OF THE INVENTION

An object of this invention is to provide a method of readily detecting the defective portion of sealing of a moisture-tight container or package.

According to this invention, there is provided a method of detecting the defective portion of sealing, comprising injecting into a moisture-tight container or package a detection liquor consisting essentially of a colored liquid organic compound and having a surface tension equal to or smaller than that of water and a permeability into small clearances equal to or higher than that of water, the detection liquor exuding outside the container through the defective portion of sealing thereby locating the defective portion of sealing.

DETAILED DESCRIPTION OF THE PREFERRED EMBODIMENT

Figure 1:
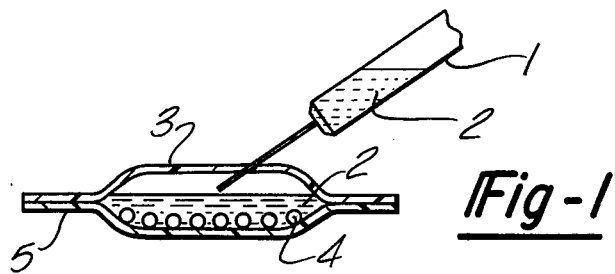
FIG. 1 is a schematic view of the detection liquor being inserted into the sealed container.
Figure 5:
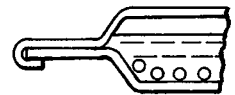
FIG. 5 is a partial section schematic view of an alternate embodiment showing the invention utilizing overlapping sheets of metal foil.

This invention is applicable to a moisture-tight container or package having a sealed portion and intended to house the contents in a moisture-free condition. Particularly suitable for application of this invention is a bag of a synthetic resin film, a metal foil or a laminate of a synthetic resin film and a metal foil, i.e., a bag formed by sealing, with an adhesive or by thermal fusion, the periphery of two overlapped sheets of any of metal foil, synthetic resin and laminate of metal foil and synthetic resin. Of course, this invention can also be applied to a rigid synthetic resin container having the upper opening covered with a moisture-tight sheet, to a rigid synthetic resin container having a detachable lid like a tapper, and to a metal or synthetic resin tube having one end fitted with a cap and the other end sealed with a sealing material.

The detection liquor suitable for this invention is provided by a liquid organic compound small in surface tension, high in permeability into small clearances and capable of exuding outside the moisture-tight container or package through the defective portion of sealing. An aqueous solution of a liquid organic compound can also be used in this invention as a detection liquor.

The detection liquor should have an affinity with the material of the container or package. Further, where an oleophilic adhesive is used for sealing, it is necessary to use a detection liquor having an affinity with the adhesive. Otherwise, the adhesive repels the detection liquor, resulting in that the detection liquor is lowered in the wetting with the permeability through the sealed portion. It is also important to note that the detection liquor should not dissolve the packed material because the packed material contains in some cases soluble substances including seasonings like table salt, sugar, sodium glutamate, etc. and highly hygroscopic substance consisting mainly of starch and protein. If the packed material is dissolved, the detection liquor bears an increased viscosity and, thus, is rendered unsuitable for use.

Liquid organic compounds providing the detection liquor meeting the above-noted requirements include, for example, lower alcohols such as methanol, ethanol and propanol; ketones such as acetone; aromatic hydrocarbons such as benzene; and halogenated hydrocarbons such as chloroform.

Since the main object of this invention is to detect the defective sealing portion permitting the moisture of the atmosphere to enter the sealed package, the detection liquor should have a surface tension equal to or smaller than that of water and a permeability into small clearances equal to or higher than that of water vapor. It is also preferred in terms of permeability into small clearances that the detection liquor have a vapor pressure higher than that of water. Incidentally, the organic compounds exemplified above have a surface tension at 20° C. ranging between about 20 and 30 dyne/cm, which is much smaller than that of water, 72.75 dyne/cm. Further, chloroform exhibits a vapor pressure of 160.5 mmHg at 20° C. and methanol 96.9 mmHg at 20° C. in contrast to 17.35 mmHg at 20° C. for water. Namely, the organic compound used in this invention as the detection liquor have a vapor pressure about 5 to 10 times as high as that of water. It has been found according to this invention that liquid organic compounds having a surface tension and a vapor pressure falling within the above-noted ranges provide excellent detection liquors. Methanol and acetone or aqueous solutions thereof containing 70% by volume or more of methanol or acetone is particularly suitable for use as the detection liquor because they are readily available and easy to handle, with methanol and the aqueous solution thereof being most preferred.

As mentioned previously, the detection liquor used in this invention is colored by a suitable coloring agent. This renders it possible not only to detect the presence of defective sealing but also to locate specifically the defective portion of sealing, if any. Namely, if there is a defective portion of sealing in the moisture-tight container or package examined, the colored detection liquor exudes outside the container through the defective portion of sealing, rendering it possible to recognize visually the defective portion of sealing without difficulty.

The coloring agent is generally selected depending on the affinity of the organic compounds with water. If organic compounds which have a relatively high affinity with water are used for the detection liquor, water-soluble coloring agents are preferably dissolved in a small amount of water and mixed with the organic compounds. Such water-soluble coloring agents include edible Reds No. 2, No. 3, No. 105 and No. 106, edible Yellows No. 4 and No. 5, edible Blues No. 1 and No. 2, edible Green No. 3 and a mixture thereof which are derived from tar and generally used as a food additive. On the other hand, where organic compounds which have a relatively low affinity with water are used for the detection liquor, printing inks such as naphthol yellow G and phthalocyanin blue are used as the coloring agent. In any case, the color of coloring agent should preferably be antagonistic with respect to the color of material to be detected.

Figure 2:
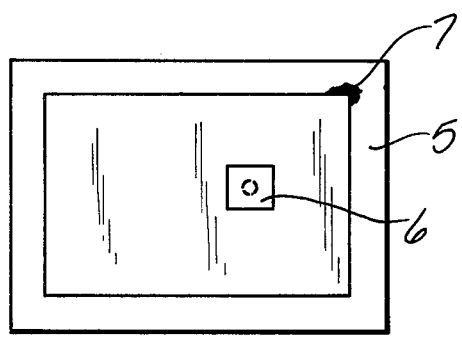
FIG. 2 is a top view of the sealed container showing the injection point resealed and the detection liquor exuding through the defective seal.

As shown in FIG. 1, detection liquor can be injected into the moisture-tight container 3 or package without difficulty. For the case of a container or package made of a moisture-tight sheet or a rigid synthetic resin container having the upper opening covered with a moisture-tight sheet, the detection liquor 2 is injected into the container or package by using a syringe 1. In this case, the needle of the syringe should be inserted through the moisture-tight sheet except the sealed portion 5 and, after the injection, the small hole made by the needle insertion should be sealed as shown at 6 in FIG. 2. For the case of a tapper or a tubular container, the lid or cap is removed and the detection liquor is poured into the container through the opening thereof. The amount of detection liquor housed in the container is not so critical. In general, the container or package is substantially filled with the packaged substance detection liquor.

As described previously, the detection liquor housed in the container promptly exudes outside the container through the defective portion 7 of sealing if any, rendering it possible to locate specifically the defective portion of sealing.

Figure 3:
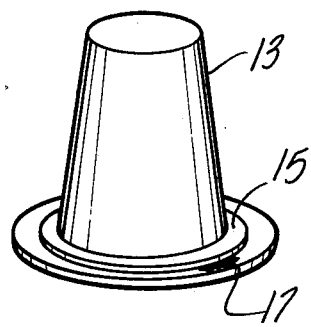
FIG. 3 is a schematic view of an alternate embodiment.
Figure 4:
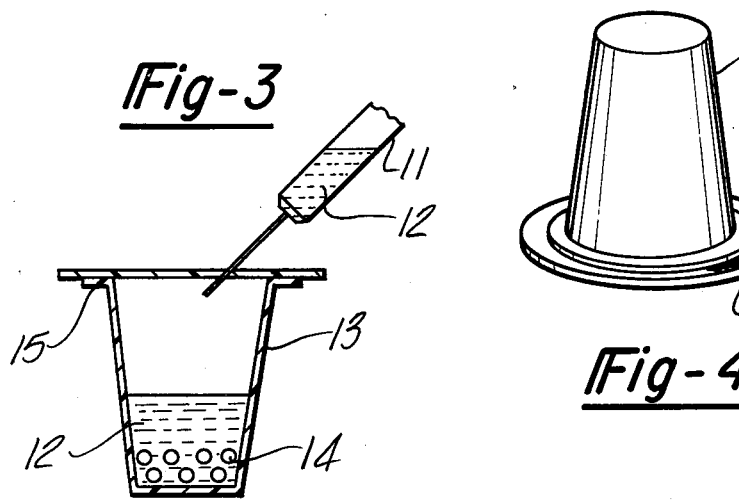
FIG. 4 is a schematic view of the alternate embodiment showing the detection liquor exuding from a defective portion of the seal.

FIGS. 3 and 4 show another type of container being used with the method of this invention. The numerals are increased by ten for corresponding references.

This invention will be more fully understood from the following Example.

EXAMPLE 1

From among bags of a moisture-tight sheet each housing a dried food 4 consisting of 4.0 g of powdered seasoning, 0.3 g of laver and 0.5 g of onion, good and bad articles were selected on the basis of the moisture absorption state of the packed food. The state of moisture absorption was determined by the feel to the touch. However, in selecting the good article, the articles judged to be free from moisture absorption by the feel to the touch were allowed to stand for 24 hours under the atmosphere of 40° C. and 90% of relative humidity. Namely, the good article was the one which was judged to be substantially free from moisture absorption under the hot and humid atmosphere.

The moisture-tight sheet used for forming the bag was the one prepared by laminating an aluminum foil $7\mu$ thick and a polyethylene film $20\mu$ thick on a high quality paper. The bag housing the dried food was the one prepared by using a di-roll type machine permitting an automatic forming of bags from the laminated sheet, an automatic loading of the dried food into the bags and an automatic sealing of the dried food-housing bags.

Aqueous solutions of methanol having varied methanol concentrations and containing a coloring agent of Edible Red No. 2 were injected into the bags by using a syringe. In this injection step, the needle of the syringe was inserted through the bag body except the sealed portion. After injection of the solution, the small hole made by the needle insertion was sealed.

To be more specific, about 10 ml of the colored solution was injected into each of the bags. About 5 to 10 minutes after the injection, the colored solution was found exuding outside the bag through the defective portion of sealing. Namely, it was possible to recognize visually the defective portion of sealing without difficulty.

The following table 1 shows the result of the test applied to 100 bags including both good and bad articles.

Table 1

| Result of Detection Test of Defective Sealing | | | | |
|---|---|---|---|---|
| Methanol | Good Article | | Bad Article | |
| Concentration (Volume %) | Exudation Rate* | Relative Accuracy | Exudation Rate * | Relative Accuracy |
| 0 | 0% | 100% | 22% | 22% |
| 20 | " | " | 30% | 30% |
| 30 | " | " | 38% | 38% |
| 40 | " | " | 44% | 44% |
| 50 | 2% | 98% | 70% | 70% |
| 60 | 6% | 94% | 82% | 82% |
| 70 | 2% | 98% | 97% | 97% |
| 80 | 4% | 96% | 99% | 99% |

Notes:
*:The exudation rate was based on the exudation recognized within 10 minutes after the solution injection.

EXAMPLE 2

The same procedure as in Example 1 was repeated except that the aqueous methanol solutions were replaced by the aqueous acetone solutions indicated in Table 2 below. The results are shown also in Table 2.

Table 2

| Acetone | Good Article | | Bad Article | |
|---|---|---|---|---|
| Concentration (Volume %) | Exudation Rate | Relative Accuracy | Exudation Rate | Relative Accuracy |
| 0 | 0 | 100 | 26 | 26 |
| 20 | 0 | 100 | 33 | 33 |
| 30 | 0 | 100 | 42 | 42 |
| 40 | 0 | 100 | 69 | 69 |
| 50 | 2 | 98 | 85 | 85 |
| 60 | 4 | 96 | 91 | 91 |
| 70 | 5 | 95 | 100 | 100 |
| 80 | 7 | 93 | 100 | 100 |

As described in detail, the invented method of detecting the defective portion of sealing does not necessitate a costly apparatus and can be performed very simply. Further, as compared with the conventional method, the defective portion of sealing can be located very promptly because the detection liquor used in this invention rapidly exudes outside the moisture-tight container or package through the defective portion of sealing, if any. It should also be noted that the degree of defectiveness can be recognized as well by observing the exudation degree of the colored liquor.

What is also important is that the result of the test very accurately reflects the feel to the touch of the sealed container or package under ordinary environments, as seen from the Example. Namely, the method of this invention is highly reliable. Thus, the result of the test can be utilized for, for example, determining the property of the moisture-tight material, finding out the mechanical trouble of the rapid-wrapping machine, discovering the defective points of the wrapping process, and for controlling the quality of the packed material.

The method of this invention can also be used for examining the sealed portions of bottles, cans and molded cups by properly selecting the composition and concentration of the detection liquor and the coloring agent added to the detection liquor, with satisfactory results.

What I claim is:
1. A method of detecting a defective sealed portion of a sealed container, said method comprising the steps of:
   (a) injecting into a sealed container a colored detection liquor consisting essentially of a coloring material giving color to said liquor and a liquid organic compound, said liquor having a surface tension lower than that of water and a permeability into small clearances greater than that of water such that the surface tension and permeability properties of said liquor permit said liquor to exude into a defective sealed portion of the sealed container;
   (b) resealing the container where the colored detection liquor was injected; and
   (c) inspecting said container for the presence of colored detection liquor, whereby a defective sealed portion of said sealed container may be detected by the visible presence of colored detection liquor in the area of a defective sealed portion.

2. The method according to claim 1, wherein the organic compound has a surface tension of about 20 to 30 dyne/cm and a vapor pressure about 5 to 10 times as high as that of water.

3. The method according to claim 2, wherein methanol is used as the organic compound.

4. The method according to claim 1, wherein the moisture-tight container is the one formed by sealing the periphery of two overlapped sheets of any of metal foil, synthetic resin and laminate of metal foil, and synthetic resin.

5. The method according to claim 1, wherein the detection liquor is an aqueous solution containing at least 70% by volume of methanol or acetone.

* * * * *

UNITED STATES PATENT AND TRADEMARK OFFICE
CERTIFICATE OF CORRECTION

PATENT NO. : 4,187,798
DATED : February 12, 1980
INVENTOR(S) : Tetsuya Yoshimura It is certified that error appears in the above-identified patent and that said Letters Patent are hereby corrected as shown below:

Column 3, line 18 delete "the" second occurrence and insert therefore ----and----.

Column 4, line 53 delete the numeral "4".

Signed and Sealed this

Fifteenth Day of July 1980

[SEAL]

Attest:

SIDNEY A. DIAMOND

Attesting Officer  Commissioner of Patents and Trademarks